(12) United States Patent
Miller et al.

(10) Patent No.: US 7,629,968 B2
(45) Date of Patent: Dec. 8, 2009

(54) METHODS AND SYSTEMS FOR DETECTING SELECTIONS ON A TOUCH SCREEN DISPLAY

(75) Inventors: Jeffrey N. Miller, Los Altos Hills, CA (US); Mark M. Butterworth, Santa Clara, CA (US); Rene P. Helbing, Palo Alto, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 762 days.

(21) Appl. No.: 11/193,155

(22) Filed: Jul. 29, 2005

(65) Prior Publication Data
US 2007/0024598 A1   Feb. 1, 2007

(51) Int. Cl.
G09G 5/00 (2006.01)
(52) U.S. Cl. .................. 345/173; 345/175; 345/176; 345/179
(58) Field of Classification Search .......... 345/173, 345/175–176, 179
See application file for complete search history.

(56) References Cited

U.S. PATENT DOCUMENTS

| 4,737,626 | A | 4/1988 | Hasegawa |
| 4,949,079 | A | 8/1990 | Loebner |
| 5,164,585 | A | 11/1992 | Lieu |
| 6,927,384 | B2 * | 8/2005 | Reime et al. ........... 250/221 |
| 2002/0088930 | A1 | 7/2002 | Graham et al. |
| 2003/0025821 | A1 * | 2/2003 | Bean et al. ........... 348/345 |
| 2005/0271319 | A1 * | 12/2005 | Graham ............. 385/14 |

FOREIGN PATENT DOCUMENTS

JP    2001-075739 A  *  3/2001
WO   WO-02/095668     11/2002

OTHER PUBLICATIONS

IBM, "Technical Disclosure Bulletin", vol. 36, No. 1 Jan. 1993, 126-127.

* cited by examiner

*Primary Examiner*—Richard Hjerpe
*Assistant Examiner*—Leonid Shapiro (57) ABSTRACT

Light beam focusing components direct light from the top surface of a touch screen display to one or more imagers. The imager or imagers capture one or more images of the top surface of the touch screen display. A processing unit analyzes the image or images to determine the position of an input device on or near the top surface of the touch screen display.

10 Claims, 9 Drawing Sheets

FIG. 11

METHODS AND SYSTEMS FOR DETECTING SELECTIONS ON A TOUCH SCREEN DISPLAY

BACKGROUND

Figure 1:
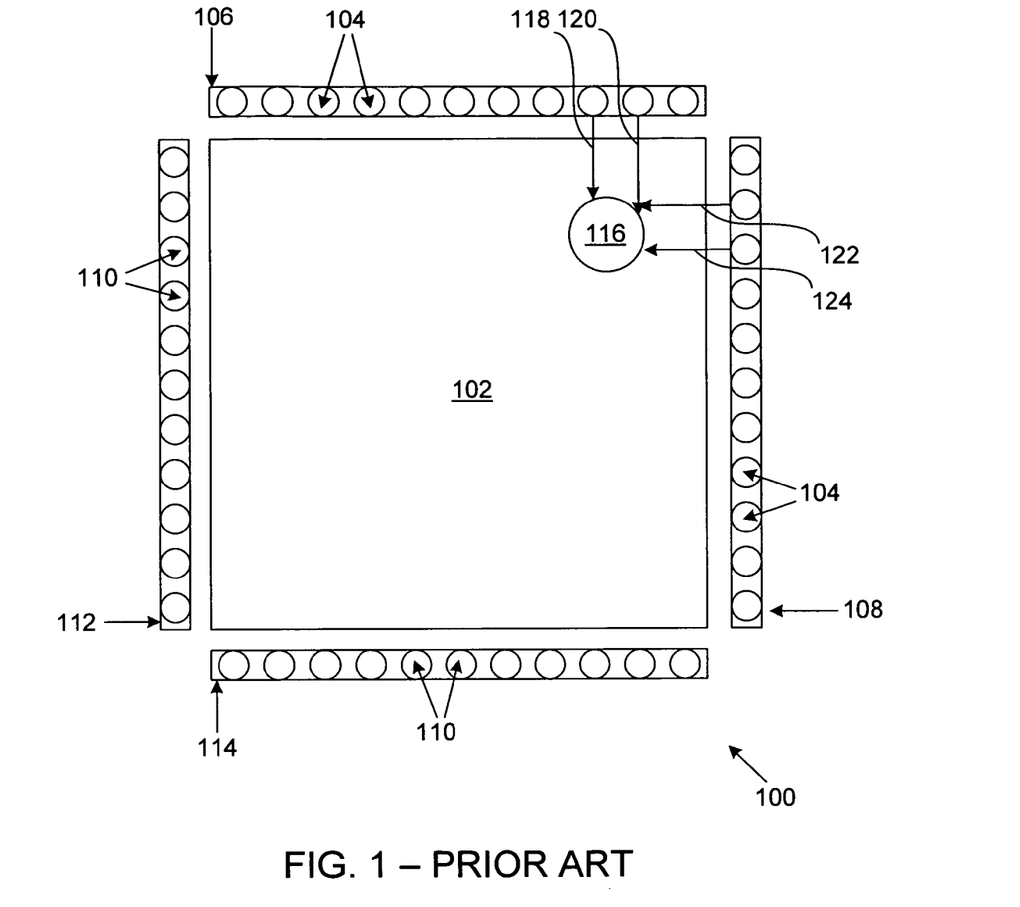
FIG. 1 is a top view of a touch screen display system according to the prior art.

Touch screen displays are used in a variety of applications, including informational kiosks, trade show displays, and customer self-service terminals. FIG. 1 is a diagrammatic illustration of a touch screen display system according to the prior art. System 100 includes display screen 102, emitters 104 in emitter arrays 106, 108, and detectors 110 in detector arrays 112, 114. Each emitter 104 in emitter arrays 106, 108 emits light over the surface of display screen 102 that is detected by opposing detectors 110 in detector arrays 112, 114.

Figure 2:
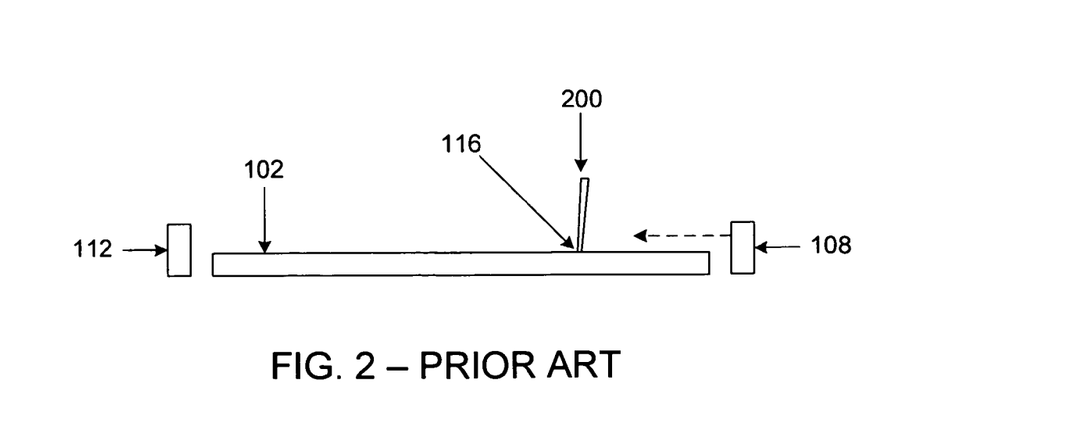
FIG. 2 is a right side view of the first touch screen display system of FIG. 1.

When an input device (see 200 in FIG. 2), such as a digit or stylus, touches site 116 on display screen 102, light beams 118, 120, 122, 124 are obstructed and not received by their respective detectors 110 in detector arrays 112, 114. The location of each detector 110 in detector arrays 112, 114 that did not receive obstructed light beams 118, 120, 122, 124 is used to determine the location of site 116 on display screen 102.

The resolution of touch screen display system 100 is proportional to the number of emitters 104 in emitter arrays 106, 108 and the number of detectors 110 in detector arrays 112, 114. A high-resolution touch screen display system uses more emitters and detectors than a low-resolution system. The additional emitters and detectors allow the high-resolution system to determine the location of a selected site (e.g. site 116) more finely and accurately. But both the cost and size of a touch screen display system increase as the number of emitters and detectors in the system grow.

SUMMARY

In accordance with the invention, methods and systems for detecting selections on a touch screen display are provided. Light beam focusing components direct light from the top surface of a touch screen display to one or more imagers. The imager or imagers capture one or more images of the top surface of the touch screen display. A processing unit analyzes the image or images to determine the position of an input device on or near the top surface of the touch screen display.

DETAILED DESCRIPTION

The following description is presented to enable one skilled in the art to make and use embodiments in accordance with the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 3:
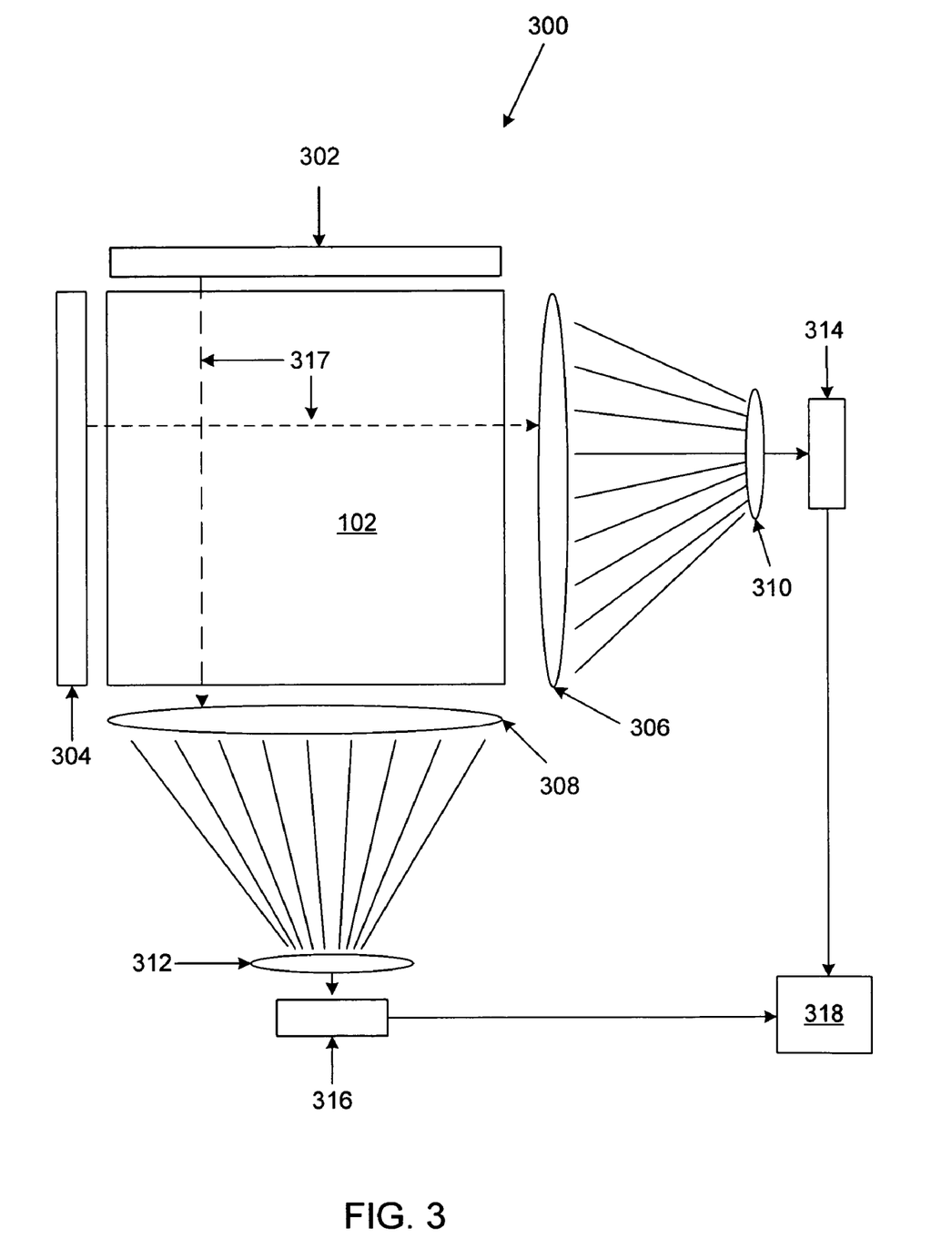
FIG. 3 is a top view of a first touch screen display system in an embodiment in accordance with the invention.

Like reference numerals designate corresponding parts throughout the figures. FIG. 3 is a top view of a first touch screen display system in an embodiment in accordance with the invention. System 300 includes touch display screen 102, light sources 302, 304, light beam focusing components 306, 308, 310, 312, and imagers 314, 316. Touch screen display 102 is shown as a square display screen. Other embodiments in accordance with the invention may implement touch screen display 102 in a different shape, such as, for example, a rectangle or oval.

Light beam focusing components 306, 308, 310, 312 are each implemented as one or more collimating lenses and imagers 314, 316 as complementary metal oxide semiconductor (CMOS) imagers in an embodiment in accordance with the invention. In other embodiments in accordance with the invention, light beam focusing components 306, 308, 310, 312 and imagers 314, 316 may be implemented with other types of components. For example, imagers 314, 316 may be implemented with charge-coupled devices. And light beam focusing components 310, 312 may be omitted in other embodiments in accordance with the invention.

Each light source 302, 304 is implemented as a continuous strip of light-emitting material in an embodiment in accordance with the invention. Examples of a light-emitting material include, but are not limited to, an organic light-emitting diode (OLED), PowderEL, and a diffuser powered by a single light-emitting diode (LED). In another embodiment in accordance with the invention, only one light source is used to capture images of the top surface of display screen 102. And in yet another embodiment in accordance with the invention, light sources 302, 304 are omitted and ambient light, the backlight from display screen 102, or both are used to capture images of the top surface of touch display screen 102.

Light beam focusing components 306, 308, 310, 312 receive light 317 emitted from light sources 302, 304 and direct the light onto imagers 314, 316. Using the directed light, imagers 314, 316 capture one or more images of the top surface of display screen 102. Imagers 314, 316 may capture the images simultaneously or sequentially, and the images may be captured continuously or intermittently in embodiments in accordance with the invention. For example, imagers 314, 316 may capture one or more images only after an input device (not shown) has applied pressure to the top surface of display screen 102. The input device may be implemented as a stylus, digit, or other pointing device in embodiments in accordance with the invention.

The images are used to detect the presence or position of an input device on the top surface of display screen 102. Processing unit 318 analyzes the images to determine positional information for the input device. Processing unit 318 is implemented as one or more microprocessors in an embodiment in accordance with the invention.

One technique for detecting the presence or position of an input device includes analyzing the pixel values in the captured images. The input device casts a shadow on imagers 314, 316 when on or near the top surface of touch screen display 102. The pixels corresponding to the location of the input device will typically have lower intensity values than the other pixels in the image. Through interpolation, processing unit 318 can analyze one or more captured images to determine which pixel or pixels have the lowest intensity values. The pixels with the lowest intensity values indicate the position of the input device.

When imagers 314, 316 use reflected light to capture images, such as in the embodiments shown in FIGS. 4-7, the pixels corresponding to the location of the input device will typically have higher intensity values than the other pixels in the image. Processing unit 318 therefore analyzes one or more captured images to determine which pixel or pixels have the highest intensity values. The pixels with the highest intensity values indicate the position of the input device.

Figure 4:
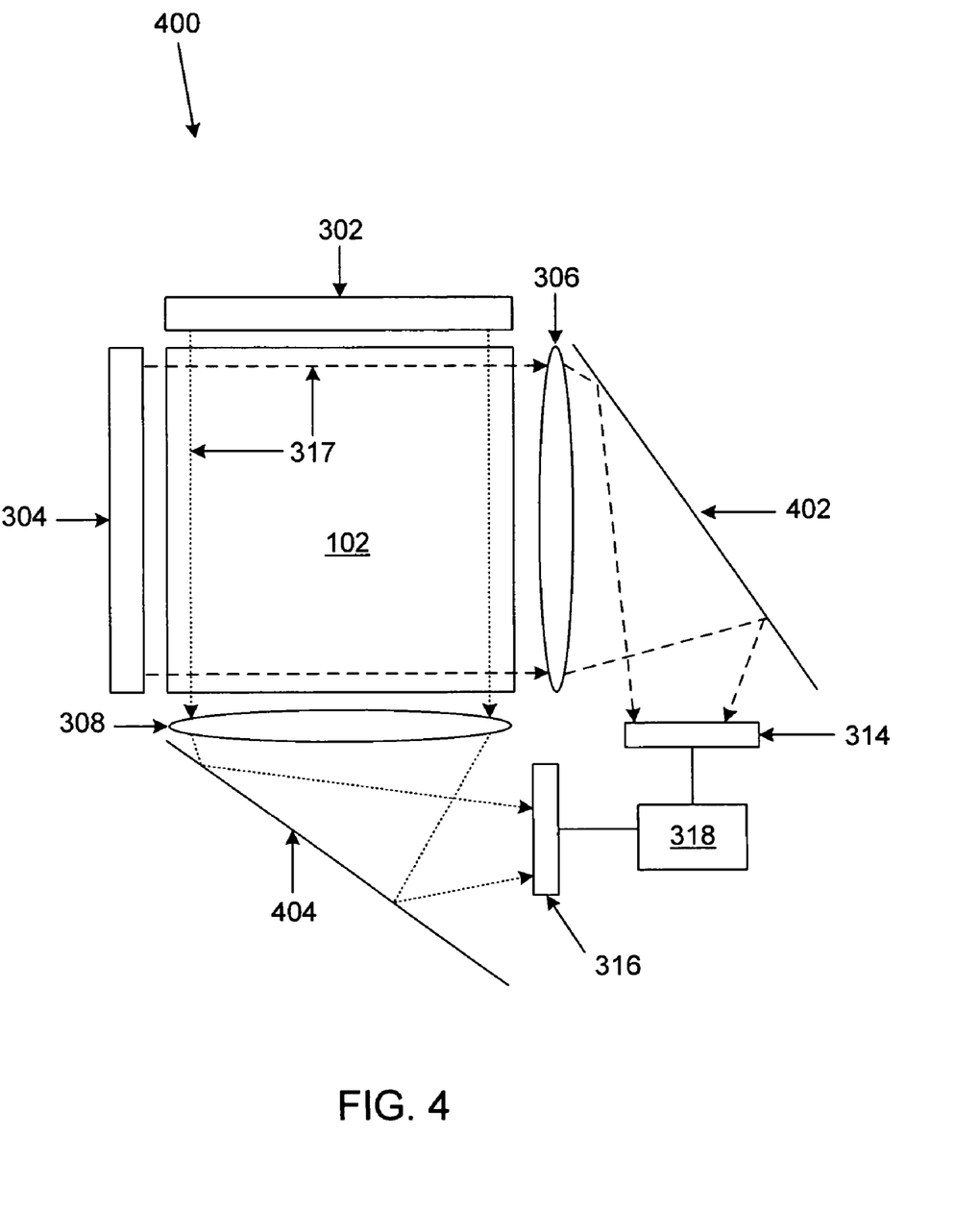
FIG. 4 is a top view of a second touch screen display system in an embodiment in accordance with the invention.

FIG. 4 is a top view of a second touch screen display system in an embodiment in accordance with the invention. System 400 includes touch display screen 102, light sources 302, 304, lenses 306, 308, imagers 314, 316, and straight mirrors 402, 404. In other embodiments in accordance with the invention, only one light source may be used to capture images of the top surface of display screen 102, or light sources 302, 304 may be omitted and ambient light, the backlight from display screen 102, or both used to capture images of the top surface of touch display screen 102.

Lenses 306, 308 combined with straight mirrors 402, 404, respectively, are light beam focusing components that receive light 317 emitted from light sources 302, 304 and direct the light onto imagers 314, 316. Using the directed light, imagers 314, 316 capture one or more images of the top surface of display screen 102. Processing unit 318 analyzes the one or more images to detect the presence or position of an input device (not shown) on the top surface of display screen 102.

Figure 5:
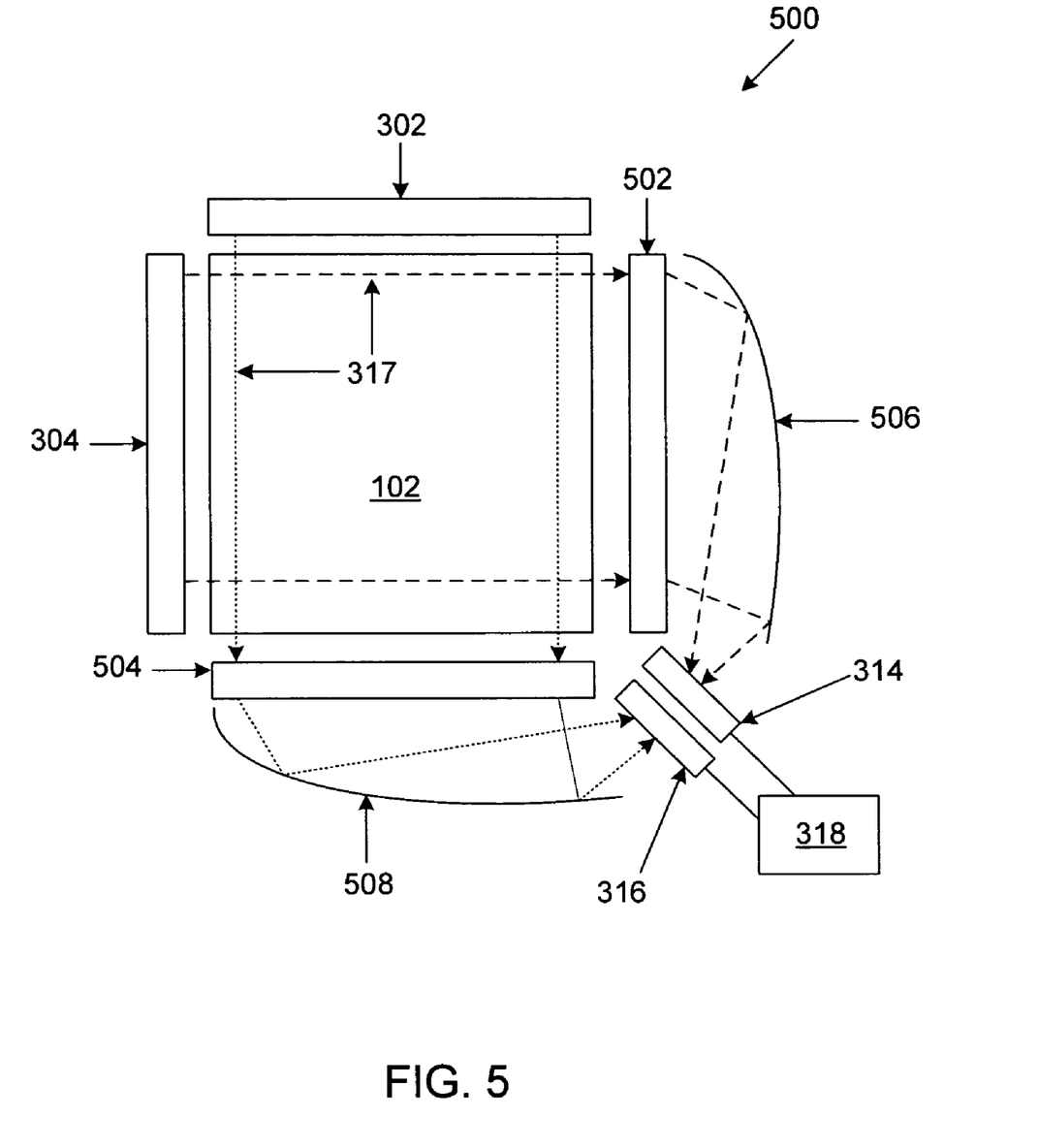
FIG. 5 is a top view of a third touch screen display system in an embodiment in accordance with the invention.

Referring to FIG. 5, there is shown a top view of a third touch screen display system in an embodiment in accordance with the invention. System 500 includes touch display screen 102, light sources 302, 304, Fresnel lenses 502, 504, curved mirrors 506, 508, and imagers 314, 316. In other embodiments in accordance with the invention, only one light source may be used to capture images of the top surface of display screen 102, or light sources 302, 304 may be omitted and ambient light, the backlight from display screen 102, or both used to capture images of the top surface of touch display screen 102.

Fresnel lenses 502, 504 combined with curved mirrors 506, 508, respectively, are light beam focusing components that receive light 317 emitted from light sources 302, 304 and direct the light onto imagers 314, 316. Using the directed light, imagers 314, 316 capture one or more images of the top surface of display screen 102. Processing unit 318 analyzes the one or more images to detect the presence or position of an input device (not shown) on the top surface of display screen 102.

Figure 6:
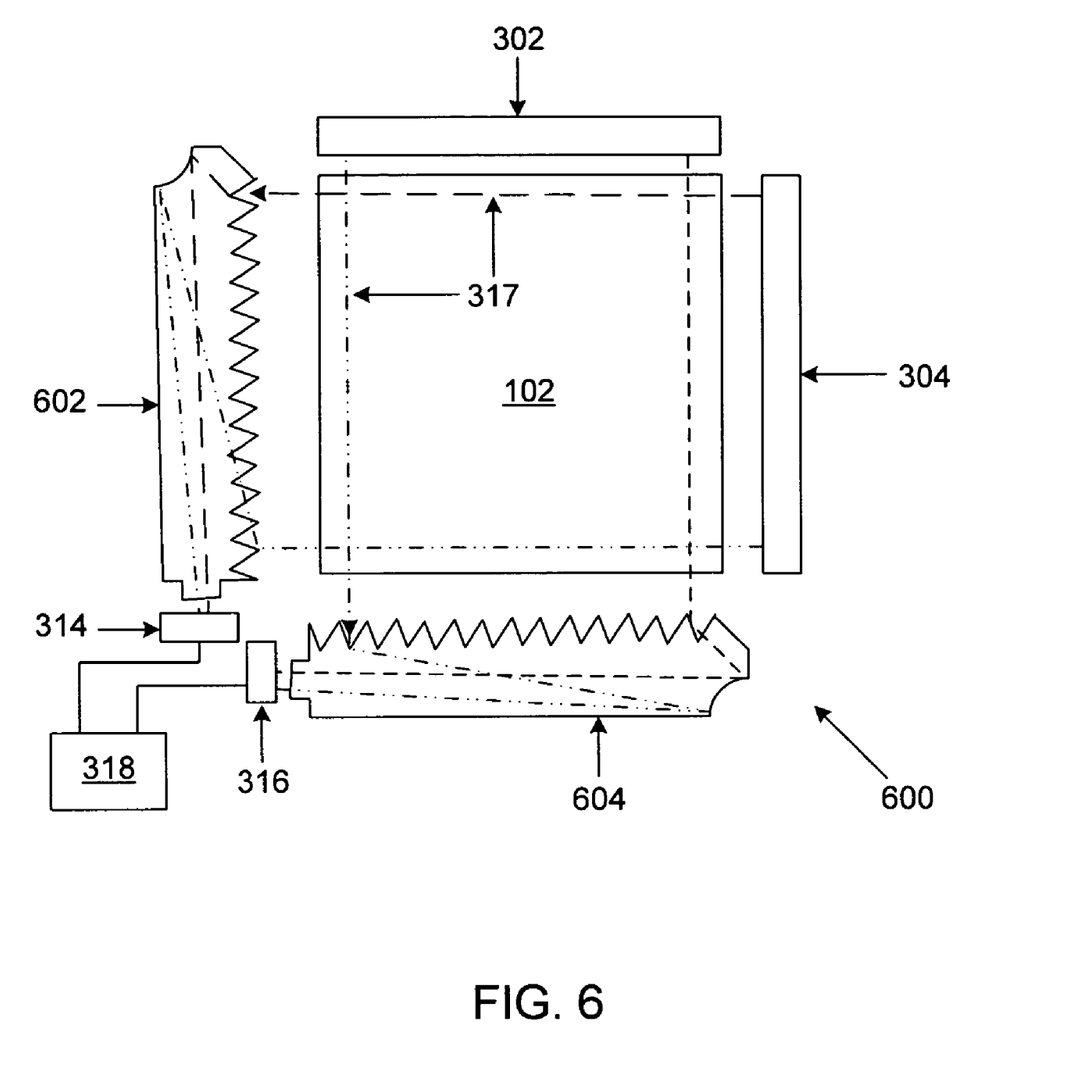
FIG. 6 is a top view of a fourth touch screen display system in an embodiment in accordance with the invention.

Referring to FIG. 6, there is shown a top view of a fourth touch screen display system in an embodiment in accordance with the invention. System 600 includes touch display screen 102, light sources 302, 304, light beam focusing components 602, 604, and imagers 314, 316. In other embodiments in accordance with the invention, only one light source may be used to capture images of the top surface of display screen 102, or light sources 302, 304 may be omitted and ambient light, the backlight from display screen 102, or both used to capture images of the top surface of touch display screen 102.

Light beam focusing components 602, 604 are implemented as TIR (total internal reflection) Fresnel lenses in an embodiment in accordance with the invention. TIR Fresnel lenses 602, 604 receive light 317 emitted from light sources 302, 304 and direct the light onto imagers 314, 316. Using the directed light, imagers 314, 316 capture one or more images of the top surface of display screen 102. Processing unit 318 analyzes the one or more images to detect the presence or position of an input device (not shown) on the top surface of display screen 102.

Figure 7A:
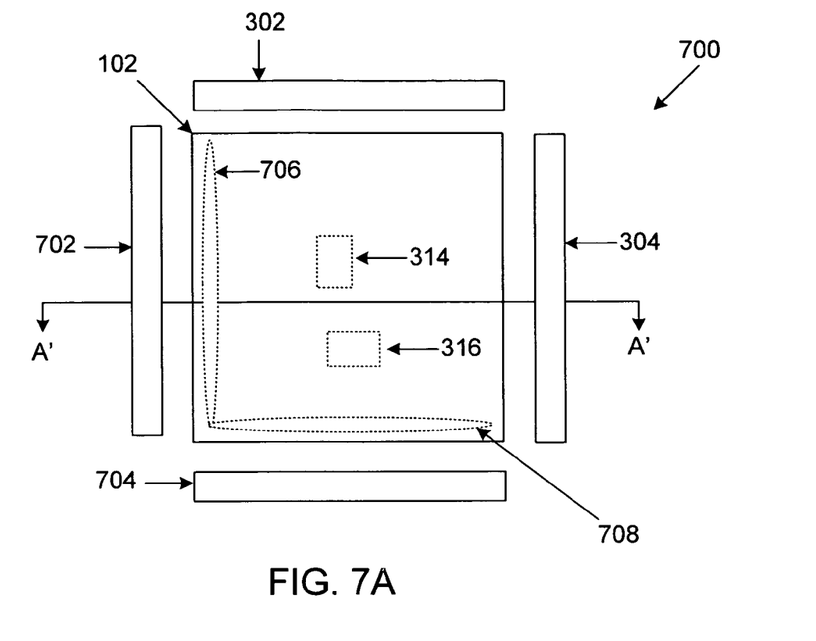
FIG. 7A is a top view of a fifth touch screen display system in an embodiment in accordance with the invention.

FIG. 7A is a top view of a fifth touch screen display system in an embodiment in accordance with the invention. System 700 includes touch display screen 102, light sources 302, 304, and reflector assemblies 702, 704, lenses 706, 708, and imagers 314, 316. Reflector assemblies 702, 704 combined with lenses 706, 708, respectively, are light beam focusing components that receive light 317 emitted from light sources 302, 304 and direct the light onto imagers 314, 316. Lenses 706, 708 and imagers 314, 316 are constructed underneath touch screen display 102 and reflector assemblies 702, 704 fold the optical path around touch screen display 102.

Figure 7B:
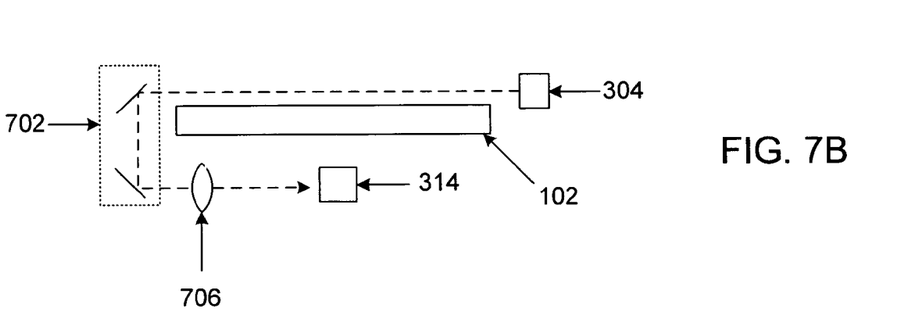
FIG. 7B is a side view along A'-A' of a first embodiment of the touch screen display system of FIG. 7A.

FIG. 7B is a side view along A'-A' of a first embodiment of the touch screen display system of FIG. 7A. Reflector assemblies 702, 704 are implemented as double fold mirrors in an embodiment in accordance with the invention. Double fold mirror assembly 702 and collimating lens 706 are light beam focusing components that direct light emitted from light source 304 onto imager 314. Double fold mirror assembly 704, collimating lens 708, and imager 316 are positioned perpendicular to double fold mirror 702, lens 706, and imager 314. This allows touch screen display system 700 to obtain positional information for an input device (not shown) in both the x and y directions.

Figure 7C:
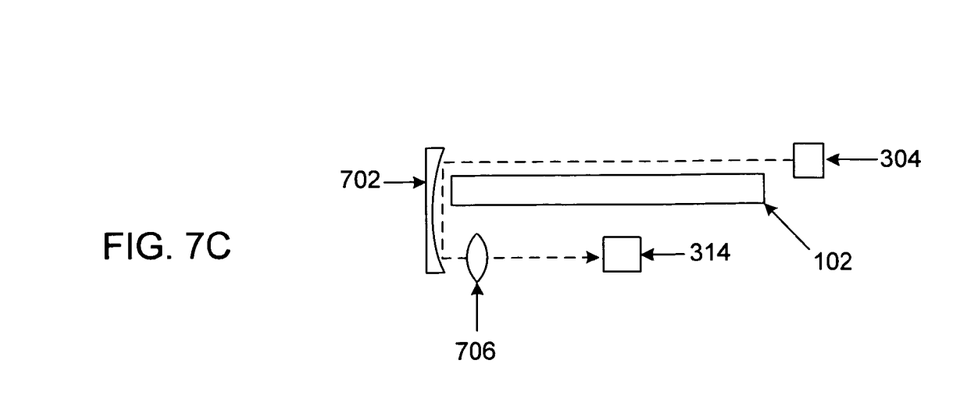
FIG. 7C is a side view along A'-A' of a second embodiment of the touch screen display system of FIG. 7A.

FIG. 7C is a side view along A'-A' of a second embodiment of the touch screen display system of FIG. 7A. Reflector assemblies 702, 704 are implemented as TIR-based retro-reflectors in an embodiment in accordance with the invention. TIR-based retro-reflector 702 and collimating lens 706 are light beam focusing components that direct light emitted from light source 304 onto imager 314. TIR-based retro-reflector 704, collimating lens 708, and imager 316 are positioned perpendicular to reflector 702, lens 706, and imager 314 in order to obtain both position information for an input device (not shown) in both the x and y directions.

Figure 8A:
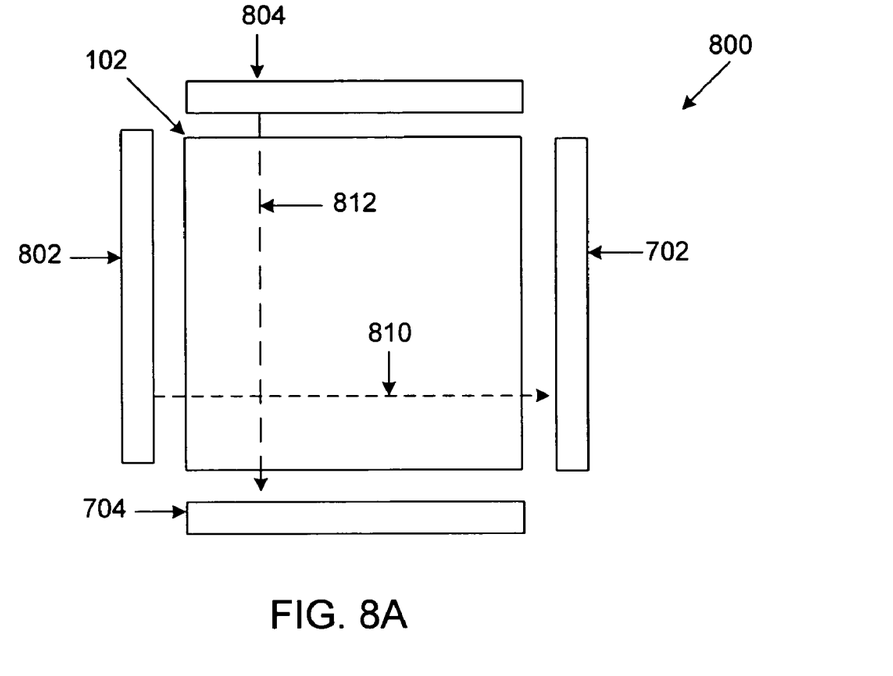
FIG. 8A is a top view of a sixth touch screen display system in an embodiment in accordance with the invention.

Referring to FIG. 8A, there is shown a top view of a sixth touch screen display system in an embodiment in accordance with the invention. System 800 includes touch display screen 102, light sources 802, 804, and reflector assemblies 702, 704. Reflector assemblies 702, 704 fold the optical path around touch screen display 102.

Figure 8B:
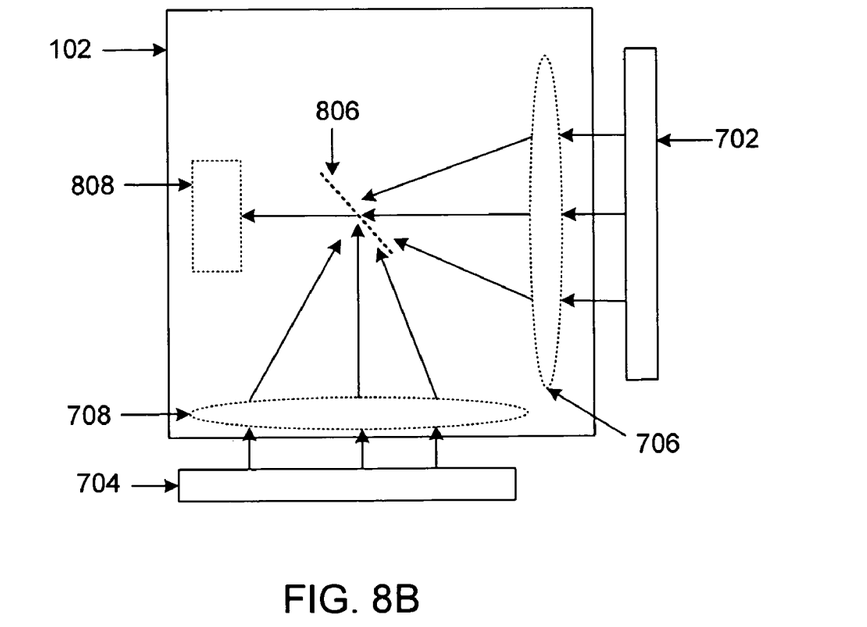
FIG. 8B is a top view of the sixth touch screen display system shown in FIG. 8A.

FIG. 8B is a top view of the sixth touch screen display system shown in FIG. 8A. Lenses 706, 708, beam combiner 806, and imager 808 are constructed underneath touch screen display 102. Beam combiner 806 is implemented as a dichroic beamsplitter and lenses 706, 708 as collimating lenses in an embodiment in accordance with the invention.

Light 810 emitted from light source 802 propagates at one particular wavelength ($\lambda_1$) while light 812 emitted from light source 804 propagates at a different wavelength ($\lambda_2$). Reflector assemblies 702, 704 combined with lenses 706, 708, respectively, are light beam focusing components that direct the light from the top surface of display screen 102 towards beam combiner 806. Beam combiner 806 combines the light propagating at two different wavelengths and directs the light onto imager 808.

Figure 9:
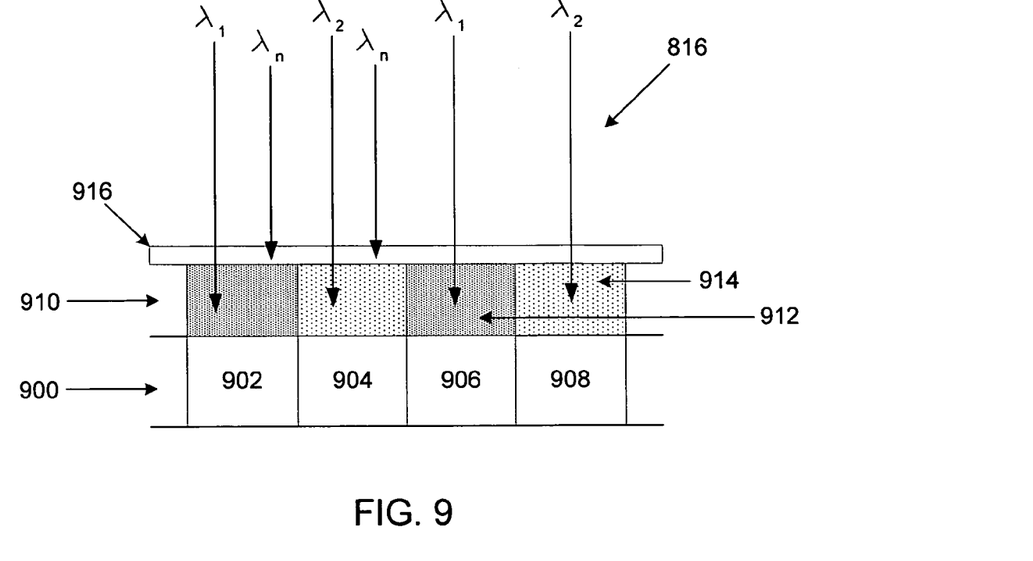
FIG. 9 is a cross-sectional diagram of an imager that may be implemented in the embodiment of FIG. 8B.

Imager 808 includes a patterned filter layer that discriminates between light propagating at wavelength $\lambda_1$ and light propagating at wavelength $\lambda_2$. FIG. 9 is shown a cross-sectional diagram of an imager that may be implemented in the embodiment of FIG. 8B. Only a portion of imager 808 is shown in this figure. Imager 808 includes sensor 900 comprised of pixels 902, 904, 906, 908, patterned filter layer 910 including two alternating filter regions 912, 914, and glass cover 916. Sensor 900 is configured as a CMOS imager and patterned filter layer 910 as two polymers 912, 914 doped with pigments or dyes in an embodiment in accordance with the invention. Each region in patterned filter layer 910 overlies a pixel in the CMOS imager.

Light passes through glass cover 916 to strike pattern filter layer 910. Polymer 912 transmits the light at wavelength $\lambda_1$ while blocking the light at wavelength $\lambda_2$ and $\lambda_n$. Consequently, pixels 902 and 906 receive only the light at wavelength $\lambda_1$, thereby generating an image providing positional information in one direction (e.g., the x direction).

Polymer 914 transmits the light at wavelength $\lambda_2$ while blocking the light at wavelength $\lambda_1$ and $\lambda_n$. Pixels 904 and 908 therefore receive only the light at wavelength $\lambda_2$. In this manner, an image providing positional information in the other direction (e.g., the y direction) is generated. One or more processing devices (e.g. processing unit 314) obtain positional information for an input device (not shown) by analyzing the captured images.

Lenses 706, 708 and imagers 314, 316 in FIG. 7 and lenses 706, 708, beam combiner 806, and imager 808 in FIG. 8 do not extend beyond the boundaries of touch screen display 102 in an embodiment in accordance with the invention. This preserves the compactness of a touch screen display assembly. Consequently, the focal length to the size of display screen 102 is restricted. For example, when the touch screen display is square in shape, the focal length of the lens is related to its radius by $1/f=(n-1)/R$, where f represents the focal length, n the index of refraction, and R the radius of a circle superimposed inside the square having a diameter equal to the length of a side of the square. For a display screen assembly implemented in a molded plastic piece, the index of refraction for plastic is typically between 1.5 and 1.6. Inputting this index of refraction into the equation above, the focal length equals 2R. The focal lengths for other touch screen display assemblies are not limited to this example. Focal lengths in other embodiments in accordance with the invention are dependent on the shape and size of the display screen and the index of refraction of the material surrounding the assembly.

Figure 10:
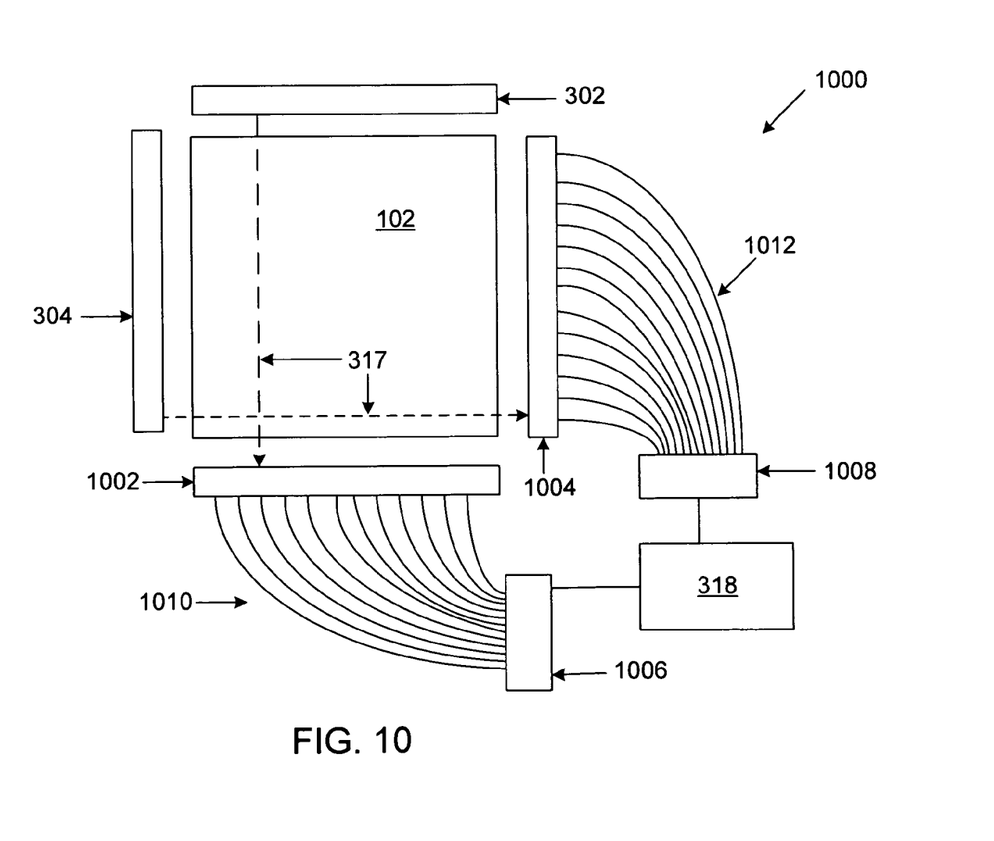
FIG. 10 is a top view of a seventh touch screen display system in an embodiment in accordance with the invention.

Referring to FIG. 10, there is shown a top view of a seventh touch screen display system in an embodiment in accordance with the invention. System 1000 includes touch display screen 102, light sources 302, 304, microlens arrays 1002, 1004, and imagers 1006, 1008. Microlens arrays 1002, 1004 and guides 1010, 1012, respectively, are light beam focusing components that direct light 317 onto imagers 1006, 1008. Guides 1010, 1012 are implemented as fiber optic bundles in an embodiment in accordance with the invention. In other embodiments in accordance with the invention, guides 1010, 1012 are implemented as arrays of waveguides.

Imagers 1006, 1008 capture one or more images of the top surface of display screen 102 using the directed light. Processing unit 318 analyzes the image or images to obtain position information for an input device (not shown) positioned on or above the top surface of display screen 102.

Figure 11:
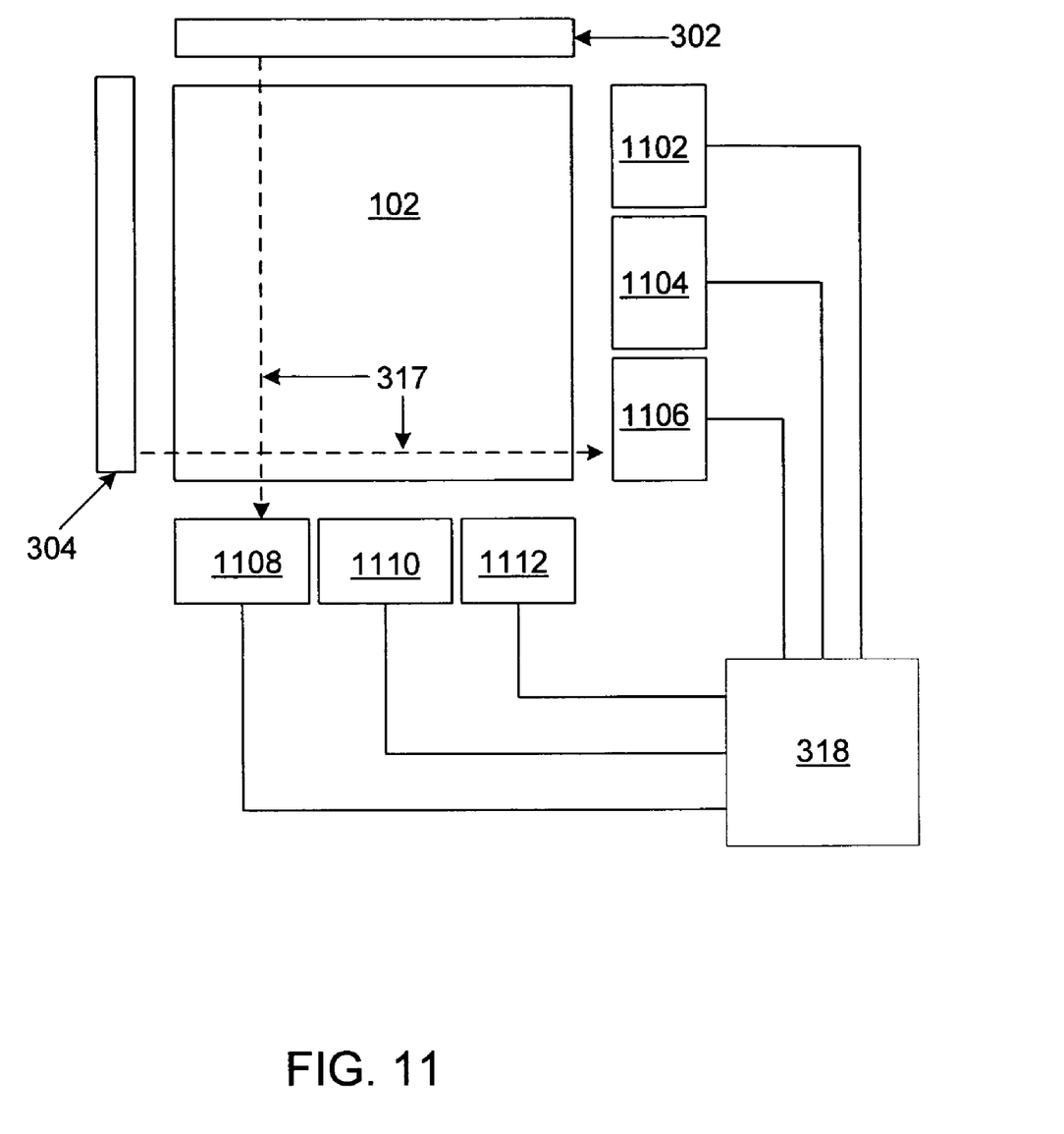
FIG. 11 is a top view of an eighth touch screen display system in an embodiment in accordance with the invention.

FIG. 11 is a top view of an eighth touch screen display system in an embodiment in accordance with the invention. System 1100 includes display screen 102, light sources 302, 304, and a number of image modules 1102, 1104, 1106, 1108, 1110, 1112. Image modules 1102-1112 may include the light beam focusing components and, if required, the beam combiner from the embodiments discussed in conjunction with FIGS. 3-10. Image modules 1102-1112 illustrate the light beam focusing components may be implemented in groups used to image a single touch screen display 102. Image modules 1102-1112 may be used, for example, when the shape or size of a touch screen display 102 can not be adequate imaged with one imager (e.g. imager 808) or two imagers (e.g., imagers 314, 316).

In the embodiments shown in FIGS. 3-11, a linear imager may be used to capture images of the top surface of touch display screen 102. A linear imager includes a single row of pixels, and when two are placed perpendicular to each other in the plane of the viewing surface, for example, as shown in FIGS. 3-5, positional information for two axes (e.g., x and y) for an input device are obtained. In another embodiment in accordance with the invention, linear imagers are positioned both inside and outside the plane of the viewing surface to obtain positional information for three axes. Moreover, tapping motions such as those for clicks and double-clicks may be detected by multiple imagers placed both inside and outside the plane of the viewing surface.

And in yet another embodiment in accordance with the invention, imagers having two or more rows of pixels are positioned in the plane of the viewing surface to obtain positional information for three axes. Moreover, the imagers may also be used to detect tapping motions.

The invention claimed is:

1. A system for a touch screen display system, comprising:
light beam focusing components operable to direct light from a top surface of a touch screen display to imagers operable to capture images using the directed light;
a processing unit operable to receive the one or more captured images and determine positional information for an input device positioned on or near the top surface of the touch screen display using at least one captured images; and
one or more light sources operable to emit light towards the top surface of the touch screen display;
wherein the imagers comprise a fist imager and a second imager and the light beam focusing components comprise a first collimating lens positioned in a first optical path between a first light source and the first imager and a second collimating lens positioned in a second optical path between a second light source and the second imager; and
wherein the first and second imagers and the first and second collimating lenses are constructed below the touch screen display and the light beam focusing components further comprise a first reflector assembly positioned between the first light source and the first collimating lens and a second reflector assembly positioned between the second light source and the second collimating lens.

2. The system of claim 1, wherein the light beam focusing components further comprise a first straight mirror positioned between the first collimating lens and the first imager and a second straight mirror positioned between the second collimating lens and the second imager.

3. The system of claim 1, wherein the first light source propagates light at a first wavelength and the second light source propagates light at a second wavelength.

4. A system for a touch screen display system, comprising:
light beam focusing components operable to direct light from a top surface of a touch screen display to one or more imagers operable to capture images using the directed light;
a processing unit operable to receive the one or more captured images and determine positional information for an input device positioned on or near the top surface of the touch screen display using at least one captured images; and
one or more light sources operable to emit light towards the top surface of the touch screen display;
wherein the one or more light sources comprise a first light source propagating light at a first wavelength and a second light source propagating light at a second wavelength;
wherein the one or more imagers comprise a first imager and the light beam focusing components comprise:
a first reflector assembly and a first collimating lens positioned in a first direction, wherein the first collimating lens is constructed below the touch screen display and the first reflector assembly is operable to direct light to the first collimating lens; and
a second reflector assembly and a second collimating lens positioned in a second direction relative to the first direction, wherein the second collimating lens is constructed below the touch screen display and the second reflector assembly is operable to direct light to the second collimating lens.

5. The system of claim 4, further comprising a beam combiner operable to receive light from the first and second collimating lenses and direct the light to the first imager.

6. The system of claim 5, wherein the first imager comprises a patterned filter layer operable to discriminate between the light propagating at the first wavelength and the light propagating at the second wavelength.

7. A system for a touch screen display system, comprising:
light beam focusing components operable to direct light from a top surface of a touch screen display to imagers operable to capture images using the directed light;
a processing unit operable to receive the one or more captured images and determine positional information for an input device positioned on or near the top surface of the touch screen display using at least one captured images; and
one or more light sources operable to emit light towards the top surface of the touch screen display;
wherein the imagers comprise a fist imager and a second imager and the light beam focusing components comprise a first Fresnel lens positioned in a first optical path between a first light source and the first imager and a second Fresnel lens positioned in a second optical path between a second light source and the second imager.

8. The system of claim 7, wherein the first Fresnel lens comprises a first TIR Fresnel lens and the second Fresnel lens comprises a second TIR Fresnel lens.

9. The system of claim 7, wherein the light beam focusing components further comprise a first curved mirror positioned between the first Fresnel lens and the first imager and a second curved mirror positioned between the second Fresnel lens and the second imager.

10. A system for a touch screen display system, comprising:
light beam focusing components operable to direct light from a top surface of a touch screen display to imagers operable to capture images using the directed light; and
a processing unit operable to receive the one or more captured images and determine positional information for an input device positioned on or near the top surface of the touch screen display using at least one captured images;
wherein the imagers comprise a fist imager and a second imager and the light beam focusing components comprise a first microlens array and a first plurality of guides operable to receive light from a first light source and direct the light to the first imager and a second microlens array and a second plurality of guides operable to receive light from a second light source and direct the light to the second imager.

* * * * *